United States Patent [19]

O'Connell

[11] Patent Number: 5,379,034

[45] Date of Patent: Jan. 3, 1995

[54] APPARATUS AND METHOD OF RADIO COMMUNICATION FROM A SUBMERGED UNDERWATER VEHICLE

[75] Inventor: Thomas A. O'Connell, North Kingstown, R.I.

[73] Assignee: The United States of America as represented by the Secretary of the Navy, Washington, D.C.

[21] Appl. No.: 77,215

[22] Filed: Jun. 15, 1993

[51] Int. Cl.6 .................................. H04B 13/02
[52] U.S. Cl. ..................... 340/850; 114/328
[58] Field of Search ............... 340/850, 851; 114/328

[56] References Cited

U.S. PATENT DOCUMENTS

| | | | |
|---|---|---|---|
| 3,161,168 | 12/1964 | Rebikoff | 114/328 |
| 3,258,595 | 6/1966 | Galante | 340/850 |
| 3,788,255 | 1/1974 | Tennyson | 114/328 |
| 3,961,589 | 6/1976 | Lombardi | 114/328 |
| 4,203,109 | 5/1980 | Ballard et al. | 340/850 |
| 4,227,479 | 10/1980 | Gertler et al. | 114/328 |
| 4,336,537 | 6/1982 | Strickland | 340/850 |
| 4,533,945 | 8/1985 | Lauvray et al. | 114/328 |

Primary Examiner—J. Woodrow Eldred
Attorney, Agent, or Firm—Michael J. McGowan; Prithvi C. Lall; James M. Kasischke

[57] ABSTRACT

A device and method for communicating from an underwater vehicle by surfacing an antenna in a towed buoy without surfacing the underwater vehicle. The underwater vehicle has control circuitry and sensors allowing the control circuitry to receive data from sensors measuring velocity, acceleration, distance to bottom, depth of vehicle, and ambient acoustic noise. The buoy is towed behind the vehicle on a tether having insulated wires therethrough which link the antenna to the vehicle. The buoy is positively buoyant.

19 Claims, 4 Drawing Sheets

APPARATUS AND METHOD OF RADIO COMMUNICATION FROM A SUBMERGED UNDERWATER VEHICLE

STATEMENT OF GOVERNMENT INTEREST

The invention described herein may be manufactured and use by or for the Government of the United States of America for governmental purposes without the payment of any royalties thereon or therefor.

BACKGROUND OF THE INVENTION (1) Field of the Invention

The present invention relates to an apparatus and a method for using radio communication from a submerged underwater vehicle and more particularly to an apparatus and method for briefly surfacing an antenna towed behind an underwater vehicle.

(2) Description of the Prior Art

The characteristics of many radio frequencies do not allow communication through water from a submerged underwater vehicle. Extremely low frequency radio bands can be used for submarine communications; however, these bands are limited by the antenna structure required and the bandwidth necessary to transmit information. For this reason, submarines or other submerged craft must either surface or deploy an antenna above the ocean communicate using conventional radio frequency bands. Stealth the primary asset of submerged craft, and it is often impractical for the submerged craft to surface to communicate. Thus it is well known in the art to deploy a positively buoyant tethered buoy to carry an antenna to the surface.

Surfacing and deploying a buoy are impractical for small underwater craft such as underwater vehicles and long range mobile mines. Nevertheless, these craft must surface on occasion to obtain navigational information from the Global Positioning System (GPS) and to communicate with the crafts' base of operations. In order to determine its coordinates, the underwater vehicle receives a code from a GPS satellite which the vehicle uses to determine its coordinates. Depending on the azimuth of the satellite, Global Positioning System data can be obtained in about one minute; however, the underwater device is subject to detection while it is above the surface. Furthermore, surfacing and submerging the underwater vehicle requires that the underwater device contain a large variable buoyancy system to allow the communications portion of the vehicle to break the surface.

SUMMARY OF THE INVENTION

Accordingly, it is a general purpose and object of the present invention to provide an apparatus and method for radio frequency communication by an underwater vehicle.

It is a further object that such apparatus and method allow the underwater vehicle to remain below the surface while the vehicle is in communication.

Another object is that such apparatus and method be applicable to a small underwater vehicle communicating with a station above the surface or obtaining global positioning information.

These objects are accomplished with the present invention by providing a system comprising an underwater vehicle, a tow cable and a towed antenna buoy. The underwater vehicle has control circuitry and sensors allowing the vehicle to surface the towed buoy without surfacing the vehicle and thereby exposing the vehicle to detection. The control circuitry receives data from sensors measuring velocity, acceleration, distance to bottom, depth of vehicle, and ambient acoustic noise. The buoy is towed behind the vehicle on a stress bearing tether cable having insulated wires passing therethrough which link the buoy antenna to the vehicle. The buoy is positively buoyant and the underwater vehicle can be either positively or negatively buoyant.

If the underwater vehicle is positively buoyant, the vehicle first climbs to a preassigned depth. The vehicle reduces its speed to the minimum possible. At this minimum speed the tethered buoy is allowed to drift to the surface. Once the buoy is at the surface the antenna can communicate with a base or receive information from a GPS satellite. Meanwhile, the vehicle is floating toward the surface. When the vehicle reaches a minimum depth, it turns on its propulsor and dives to avoid surfacing. The tether provided is selected to be icing enough to allow the buoy to acquire a Global Positioning System fix or communicate with the base of operations before the vehicle floats to the minimum depth.

If the underwater vehicle is negatively buoyant, the vehicle first climbs to a preassigned depth. The vehicle reduces its speed to the minimum possible. At this minimum speed the tethered buoy drifts to the surface. At the surface the buoy obtains coordinates from the Global Positioning System or communicates with the vehicle's base. Meanwhile, the vehicle is slowly sinking. When the sinking vehicle reaches the length of the tether, the buoy is pulled beneath the surface. The tether cable is selected to be long enough to allow the vehicle time to communicate before pulling the buoy under the surface. The vehicle then turns on its propulsor and continues with its mission.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein.

DESCRIPTION OF THE PREFERRED EMBODIMENT

Figure 1:
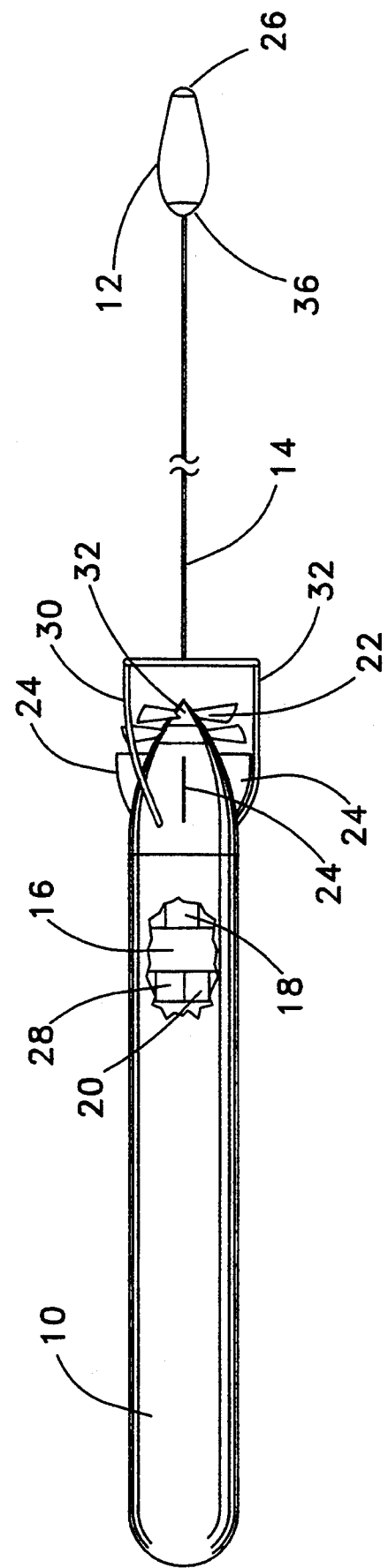
FIG. 1 shows a partially cutaway pictorial view of the underwater vehicle with the towed antenna buoy of the current invention.

Referring now to FIG. 1 there is shown a cutaway pictorial view of a typical small underwater vehicle 10 with an antenna buoy 12 towed on a tether 14. Tether 14 has electrically conductive cables running the length thereof to allow vehicle 10 to communicate with antenna buoy 12. Underwater vehicle 10 is controlled by control circuitry 16 comprising a microprocessor and memory components. The procedures for operating, navigating and surfacing vehicle 10 are stored in these memory components. Control circuitry 16 is electrically linked to a navigational computer 18 and various instruments 20. Some of the instruments present aboard underwater vehicle 10 are accelerometers for determining acceleration in linear, lateral or vertical directions; doppler sonar for sensing bottom depth and vehicle speed relative to the bottom; a pressure gauge for sensing vehicle depth; and listening devices for detecting the presence of other craft. Control circuitry 16 is electrically connected to control a propulsor 22 and fins 24 to guide vehicle 10.

Buoy 12 is hydrodynamically shaped to allow it to be towed through the water with a minimum of drag. The rear end of buoy 12 is shaped to provide a slight amount of drag to prevent buoy 12 from passing vehicle 10 when vehicle 10 is decelerating. An antenna 26 is positioned at the back of buoy 12, the part of buoy 12 most remote from tether 14. Antenna 26 is in communication with a receiver 28 aboard vehicle 10 via tether 14. Tether 14 is attached to vehicle 10 by a tow skeg 30 to avoid fouling tether 14 in propulsor 18. Tow skeg 30 holds tether 14 away from propulsor 18 to prevent tether 14 from entangling in propulsor 18 during sharp turns. Tow skeg 30 has three support members 32 to provide lateral and vertical stability to skeg 30.

Overall buoy 12 is positively buoyant; however, front 34 of buoy 18 near tether 14 is slightly weighted to stabilize buoy 12 in the vertical direction while at the surface. Buoy 12 can be gas filled so that buoy 12 expands when subjected to lower external pressure at or near the surface and contracts at operating depth. A gas filled buoy 12 thus provides increased buoyancy when at the surface and reduced drag at operating depth Control circuitry 16 can be programmed to communicate after any of several different criteria have been met. The vehicle 10 can surface buoy 12 to communicate after a set time period has elapsed, or vehicle 10 can also maneuver to obtain global positioning data if sensor readings are inconsistent with data stored in memory, e.g. sensor depth is different from the depth recorded in memory for a specific location. Vehicle 10 can be programmed to surface the buoy 12 to communicate detection or absence of detection of another craft after a preset time period.

Control circuitry 16 can be programmed to avoid a prescheduled communications maneuver if certain conditions are met. If instruments 20 detect excessive noise from the presence of other craft control circuitry 16 can abort the maneuver. Surfacing buoy 12 can also be aborted when the bottom is too shallow and vehicle 10 will either surface or ground out before radio communications have been completed.

Figure 2A:
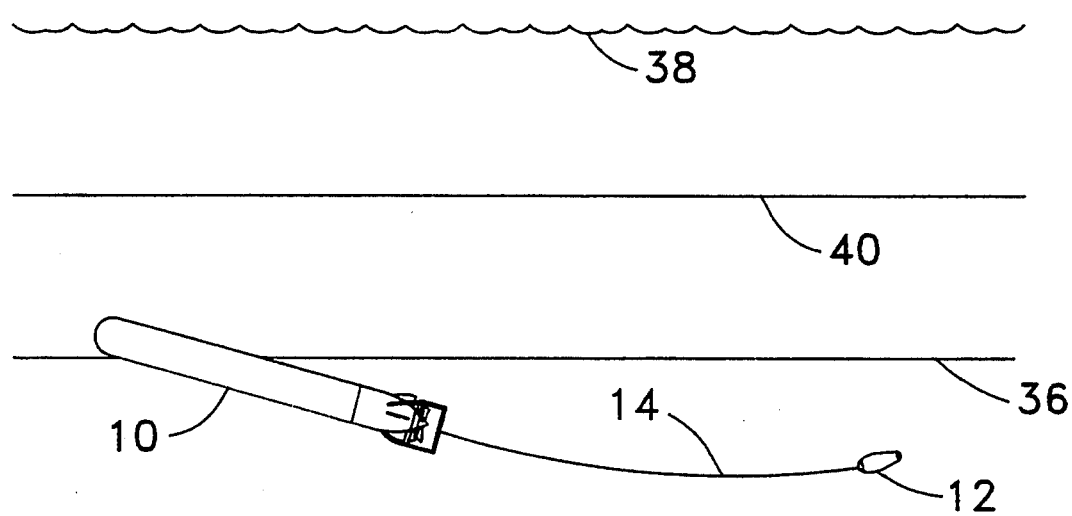
FIG. 2A shows a pictorial view of the first stage of the method of surfacing the towed antenna buoy when the underwater vehicle is positively buoyant.
Figure 2B:
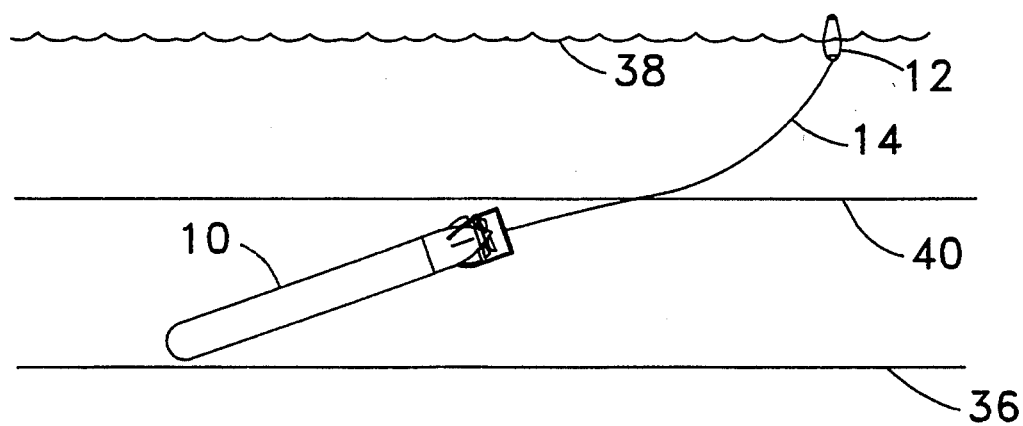
FIG. 2B shows a pictorial view of the second stage of the method of surfacing the towed antenna buoy when the underwater vehicle is positively buoyant.
Figure 2C:
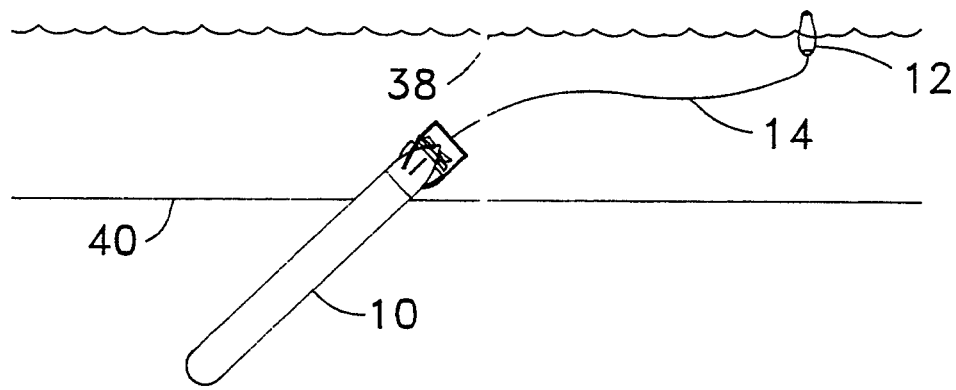
FIG. 2C shows a pictorial view of the third stage of the method of surfacing the towed antenna buoy when the underwater vehicle is positively buoyant.
Figure 2D:
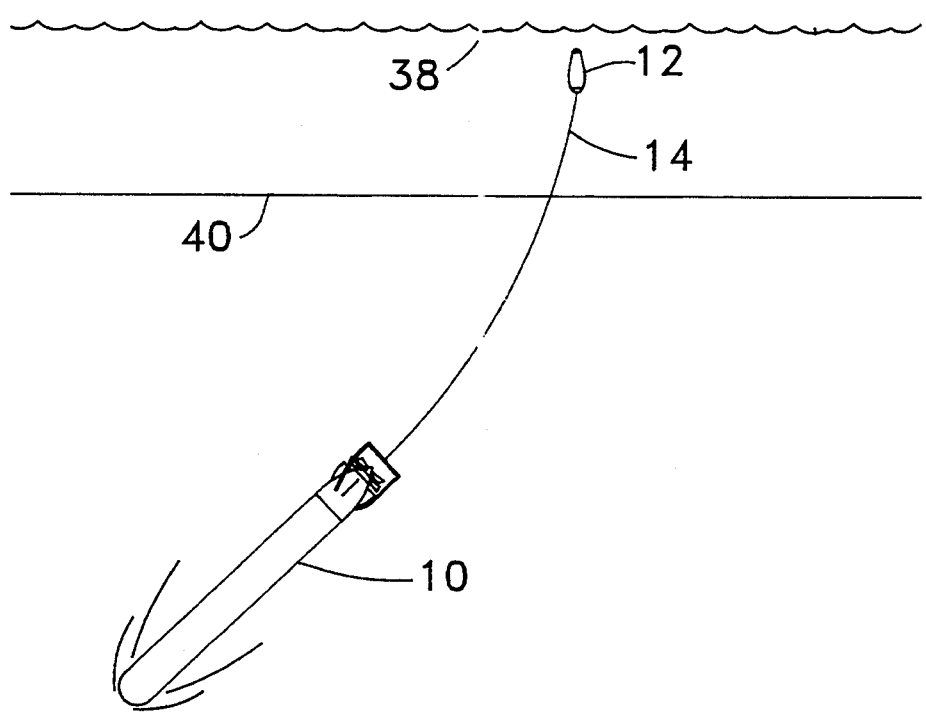
FIG. 2D shows a pictorial view of the fourth stage of the method of surfacing the towed antenna buoy when the underwater vehicle is positively buoyant.

FIG. 2A, 2B, 2C and 2D show the method of surfacing towed antenna buoy 12 when underwater vehicle 10 is positively buoyant. Referring now to FIG. 2A, when radio communication is required from a positively buoyant vehicle 10, vehicle 10 climbs to a preassigned depth 36 and reduces its speed to the minimum possible (i.e., dead slow or stopped). The speed reduction allows buoy 12 to float toward surface 38 instead of trailing vehicle 10. When buoy 12 breaks surface 38, it begins receiving or transmitting radio signals. While buoy 12 is drifting upward, vehicle 10 is also floating gradually toward surface 38 albeit at a slower rate than buoy 12. See FIG. 2B. By taking into account the ascent rate of vehicle 10, the length of tether 14 can be configured to allow buoy 12 to remain at surface 38 for enough time to communicate or obtain a global positioning system fix, approximately one minute. FIG. 2C displays when vehicle 10 passes a minimum depth 40, and vehicle 10 activates its propulsor 18 and dives to prevent vehicle 10 from surfacing. Thus, buoy 12 is pulled beneath surface 38. See FIG. 2D.

Figure 3A:
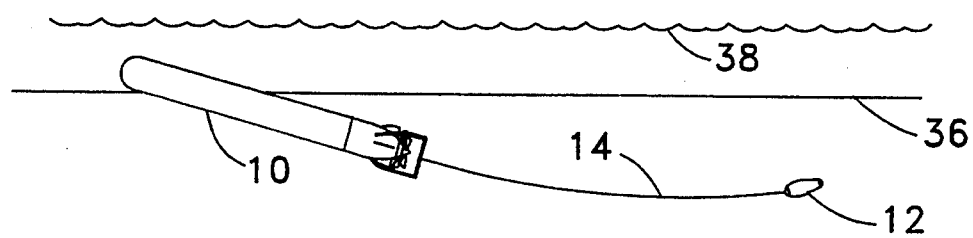
FIG. 3A shows the method of surfacing the towed antenna buoy when the underwater vehicle is negatively buoyant.
Figure 3B:
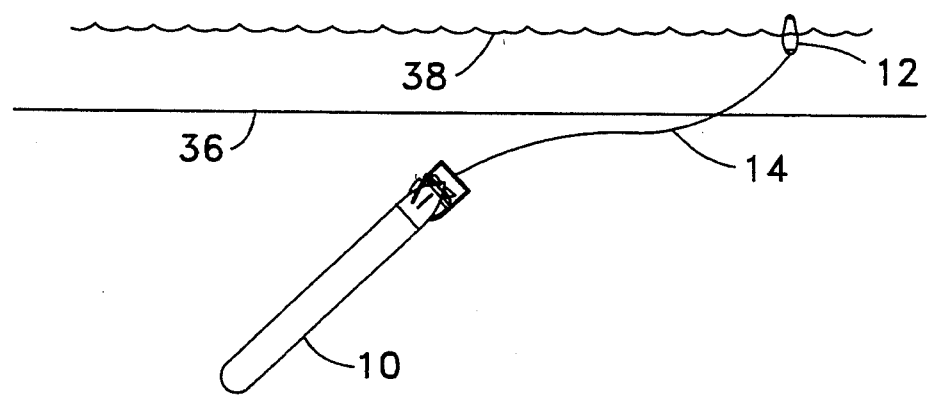
FIG. 3B shows a pictorial view of the second stage of the method of surfacing the towed antenna buoy when the underwater vehicle is negatively buoyant.
Figure 3C:
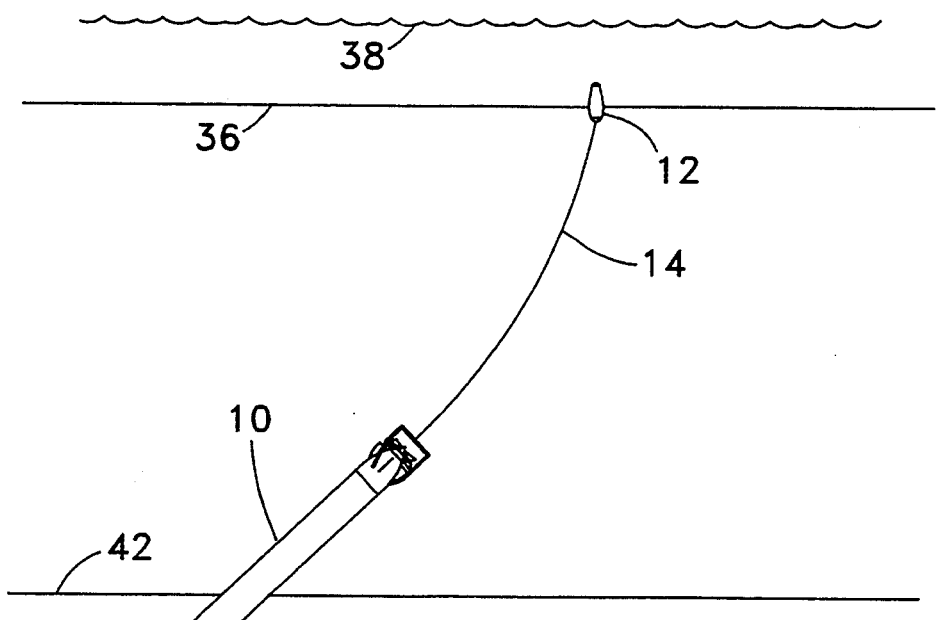
FIG. 3C shows a pictorial view of the third stage of the method of surfacing the towed antenna buoy when the underwater vehicle is negatively buoyant.

FIG. 3A, 3B and 3C show the method of surfacing towed antenna buoy 12 when underwater vehicle 10 is negatively buoyant. As with a positively buoyant vehicle (see FIG. 2A), FIG. 3A shows negatively buoyant vehicle 10 climbing to a preassigned depth 36. At this depth vehicle 10 reduces its speed to allow buoy 12 to rise to surface 38. Buoy 12 begins receiving or transmitting radio signals when buoy 12 breaks surface 38 as shown in FIG. 3B. Vehicle 10 slowly sinks while it is stationary. When vehicle 10 sinks to a critical depth 42 below reach of tether 14, buoy 12 is pulled beneath surface 38 as shown in FIG. 3C. Vehicle 10 can then turn on its propulsor continue movement.

The timing required for communicating or obtaining a GPS fix is dependent on the location of the other station with respect to the underwater vehicle. Because of surface conditions, communications are quicker when the other station is overhead than when the station is near the horizon. Accordingly, control circuitry should account for the timing of contact with the station by aborting the surfacing maneuver if contact is not obtained within a set time period or by executing the final phase of the maneuver as soon as communication has occurred.

The advantages of the present invention over the prior art are that an underwater vehicle can obtain a global positioning fix or communicate with a station without subjecting itself to detection. The underwater vehicle does not need a large variable buoyancy system to allow the vehicle to broach the surface nor does the vehicle need gas supplies to fill the variable buoyancy system.

What has thus been described is an apparatus and method allowing an underwater vehicle to engage in radio communications without surfacing itself.

Obviously many modifications and variations of the present invention may become apparent in light of the above teachings. For example: the antenna can be used to obtain other information from a control source as well as global positioning information; the underwater vehicle can be fitted with a winch to haul in the buoy once communication has been completed; the underwater vehicle can have vertical thrusters allowing it to hover; and the receiving circuitry can be embodied in the buoy rather than in the vehicle.

In light of the above, it is therefore understood that within the scope of the appended claims, the invention may be practiced otherwise than as specifically described.

What is claimed is:

1. A covert communication apparatus comprising:

an underwater vehicle;

a tow cable fixed to said underwater vehicle at the rear of said vehicle;

a hydrodynamically, shaped buoy having a positive buoyancy disposed at the end of said tow cable away from said underwater vehicle;

a propulsor disposed on said underwater vehicle for providing linear motion to said underwater vehicle;

a guidance means disposed on said underwater vehicle for guiding said underwater vehicle in the vertical and lateral directions;

electrical control circuitry disposed within said underwater vehicle and linked to said propulsor and to said guidance means for controlling said underwater vehicle based on instructions encoded in said control circuitry; and a depth gauge disposed within said underwater vehicle and electrically connected to said control circuitry for measuring the depth of said underwater vehicle under the surface of the water.

2. A covert communication apparatus as in claim 1 wherein said tow cable has tensile strength bearing members and a plurality of electrical communication members embodied therein, said tow cable being fixed to said underwater vehicle in such a way as to avoid interference with said propulsor.

3. A covert communication apparatus as in claim 2 wherein the portion of said buoy nearest said tow cable is weighted to allow said buoy to maintain a vertical orientation when said buoy is at the surface.

4. A covert communication apparatus as in claim 3 further comprising:

an antenna positioned on said buoy to allow said antenna to be above the surface of the water when said buoy is at the surface of the water, said antenna being electrically connected to said electrical communication members in said tow cable; and radio communications equipment disposed within said underwater vehicle, said radio communications equipment being electrically connected to said electrical communication members within said tow cable and being electrically connected to said control circuitry for receiving signals from said antenna and communicating said signals to said control circuitry.

5. A covert communication apparatus as in claim 4 further comprising a doppler sonar of the type capable of measuring distances and velocities, said doppler sonar being disposed within said underwater vehicle and electrically connected to said control circuitry for measuring the distance between said underwater vehicle and the bottom of a body of water through which said vehicle is travelling, measuring the velocity of said underwater vehicle with respect to said bottom, and providing said measurements to said control circuitry.

6. A covert communication apparatus as in claim 5 further comprising a plurality of accelerometers electrically connected to said control circuitry for detecting acceleration in linear, lateral and vertical directions.

7. A covert communication apparatus as in claim 6 further comprising a passive sonar listening device electrically connected to said control circuitry for detecting the presence of other craft in the vicinity of said underwater vehicle.

8. A covert communication apparatus as in claim 7 wherein said buoy is partially filled with gas to allow said buoy to contract when external water pressure increases and expand when external water pressure decreases.

9. A covert communication apparatus as in claim 8 wherein:

said antenna is designed to receive global positioning signals from a satellite; and said radio communications equipment converts said global positioning signals from said satellite to coordinates of a form usable by said control circuitry.

10. A method used by an underwater vehicle for maneuvering a towed antenna buoy to the surface without surfacing said underwater vehicles, comprising the steps of:

moving said underwater vehicle to a preassigned depth;

slowing the forward motion of said underwater vehicle at said preassigned depth to allow said positively buoyant buoy to float to the surface;

communicating with said antenna on said buoy while said buoy is positioned at the surface;

using said underwater vehicle to pull said buoy beneath the surface after communication is completed;

monitoring the time since said underwater vehicle has slowed its forward motion;

activating the propulsor of the underwater vehicle if communication has not been achieved within a set time period after said underwater vehicle has slowed its forward motion;

measuring the distance from said underwater vehicle to the bottom of said body of water before moving said underwater vehicle to a preassigned depth;

measuring the depth of said underwater vehicle before moving said underwater vehicle to a preassigned depth;

determining if said underwater vehicle can communicate with said buoy without surfacing or grounding out from said measured distance and said measured depth; and aborting said maneuver if said underwater vehicle determines that said vehicle cannot communicate without surfacing or grounding out.

11. A method as in claim 10 wherein the step of using said underwater vehicle to pull said buoy beneath the surface comprises the steps of:

allowing said underwater vehicle to sink after slowing the forward motion thereof;

using said tether to pull said buoy beneath the surface after said vehicle has sunk to the length of said tether.

12. A method as in claim 11 further comprising the steps of:

detecting sonic emissions to determine if other craft are present before moving said underwater vehicle to a preassigned depth; and aborting said maneuver if sonic emissions from other craft are detected.

13. A method as in claim 10 wherein the step of using said underwater vehicle to pull said buoy beneath the surface comprises the steps of:

allowing said underwater vehicle to rise after slowing the forward motion thereof;

activating the propulsor of said underwater vehicle; and using said tether to pull said buoy beneath the surface after said vehicle has sunk to the length of said tether.

14. A method as in claim 13 further comprising the steps of: monitoring the depth of the vehicle; and activating the propulsor of the vehicle if communication has not been achieved when the vehicle has risen to a critical depth.

15. A method as in claim 14 further comprising the steps of:

detecting sonic emissions to determine if other craft are present before moving said underwater vehicle to a preassigned depth; and aborting said maneuver if sonic emissions from other craft are detected.

16. A covert communication apparatus comprising:

an unmanned underwater vehicle having a propulsor disposed thereon said underwater vehicle for providing linear motion to said underwater vehicle, a guidance means disposed therein for guiding said underwater vehicle in the vertical and lateral directions, electrical control circuitry disposed within said underwater vehicle and linked to said propulsor and to said guidance means for controlling said underwater vehicle based on instructions encoded in said control circuitry, radio communications equipment disposed therein, and a depth gauge disposed within said underwater vehicle and electrically connected to said control circuitry for measuring the depth of said underwater vehicle under the surface of the water;

a tow cable fixed to said underwater vehicle at the rear of said vehicle, said tow cable having tensile strength bearing members and a plurality of electrical communication members embodied therein, said tow cable being fixed to said underwater vehicle in such a way as to avoid interference with said propulsor; and a hydrodynamically shaped buoy having a positive buoyancy disposed at the end of said tow cable away from said underwater vehicle, and an antenna positioned on said buoy to allow said antenna to be above the surface of the water when said buoy is at the surface of the water, said antenna being electrically connected to said electrical communication members in said tow cable;

said radio communications equipment being electrically connected to said electrical communication members within said tow cable and being electrically connected to said control circuitry for receiving signals from said antenna and communicating said signals to said control circuitry.

17. A covert communication apparatus as in claim 16 wherein said buoy is partially filled with gas to allow said buoy to contract when external water pressure increases and expand when external water pressure decreases.

18. A covert communication apparatus as in claim 17 further comprising a passive sonar listening device electrically connected to said control circuitry for detecting the presence of other craft in the vicinity of said unmanned underwater vehicle.

19. A covert communication apparatus as in claim 18 wherein:

said antenna is designed to receive global positioning signals from a satellite; and said radio communications equipment converts said global positioning signals from said satellite to coordinates of a form usable by said control circuitry.

* * * * *